United States Patent
Callard et al.

(10) Patent No.: US 9,226,196 B2
(45) Date of Patent: Dec. 29, 2015

(54) SYSTEMS AND METHODS FOR PILOT SIGNAL AND CONTROL DATA RETRANSMISSION

(71) Applicant: Huawei Technologies Co., Ltd., Shenzhen (CN)

(72) Inventors: Aaron James Callard, Ottawa (CA); Hamidreza Farmanbar, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 224 days.

(21) Appl. No.: 13/679,266

(22) Filed: Nov. 16, 2012

(65) Prior Publication Data
US 2014/0140336 A1   May 22, 2014

(51) Int. Cl.
*H04W 28/06* (2009.01)
*H04L 1/18* (2006.01)
*H04L 1/00* (2006.01)

(52) U.S. Cl.
CPC .......... *H04W 28/065* (2013.01); *H04L 1/1819* (2013.01); *H04L 1/0026* (2013.01); *H04L 1/1845* (2013.01)

(58) Field of Classification Search
CPC .................................................. H04W 28/065
See application file for complete search history.

(56) References Cited

U.S. PATENT DOCUMENTS

| | | | | |
|---|---|---|---|---|
| 7,426,201 B2 * | 9/2008 | Kim | ..................... | H04B 7/2637 370/329 |
| 7,885,176 B2 * | 2/2011 | Pi | ......................... | H04L 5/0007 370/204 |
| 8,514,721 B2 * | 8/2013 | Luo | ....................... | H04L 1/1822 370/241 |
| 8,576,792 B2 * | 11/2013 | Kim | ..................... | H04L 1/1819 370/328 |
| 2009/0158110 A1 * | 6/2009 | Park | ..................... | H04L 1/1845 714/748 |
| 2009/0276674 A1 * | 11/2009 | Wei | ......................... | H04L 1/16 714/749 |

(Continued)

OTHER PUBLICATIONS

Tsatsanis, M., et al., "Network-assisted diversity for random access wireless networks," IEEE Transactions on Signal Processing, vol. 48, No. 3, Mar. 2000, pp. 702-711.

*Primary Examiner* — Candal Elpenord
(74) *Attorney, Agent, or Firm* — Slater & Matsil, L.L.P.

(57) ABSTRACT

Historical decoding can be performed in accordance with pilot signal retransmission or control information retransmission to reduce the amount network resources consumed during data recovery. In one example, historical decoding is achieved through retransmitting a sub-set of coded bits carried by an earlier transmission, which are compared with a corresponding portion of the original signal (stored in memory) to obtain improved channel state information (CSI) relating to that earlier transmission. In another example, historical decoding is achieved through communicating parity information related to a sub-set of the coded bits carried by an earlier transmission, which are used in accordance with a data aided CSI technique to obtain the improved CSI relating to that earlier transmission. In yet another example, historical decoding is achieved by re-transmitting control information carried by an earlier transmission.

12 Claims, 9 Drawing Sheets

(56) References Cited

U.S. PATENT DOCUMENTS

| | | |
|---|---|---|
| 2010/0098006 A1 | 4/2010 | Golitschek Edler Von Elbwart et al. |
| 2010/0125764 A1* | 5/2010 | Kose ................. H03M 13/1171 714/704 |
| 2010/0220608 A1* | 9/2010 | Skillermark ......... H04B 7/0417 370/252 |
| 2010/0317291 A1 | 12/2010 | Richardson |
| 2010/0322165 A1 | 12/2010 | Yoo |
| 2011/0013615 A1* | 1/2011 | Lee ....................... H04L 5/0023 370/344 |
| 2011/0099446 A1* | 4/2011 | Murakami ............ H04L 1/0041 714/748 |
| 2011/0110304 A1 | 5/2011 | Kuchi et al. |
| 2011/0119548 A1 | 5/2011 | Imamura et al. |
| 2013/0083742 A1* | 4/2013 | Baldemair ........ H04W 72/0406 370/329 |

\* cited by examiner

SYSTEMS AND METHODS FOR PILOT SIGNAL AND CONTROL DATA RETRANSMISSION

TECHNICAL FIELD

The present invention relates generally to wireless communications, and, in particular embodiments, to systems and methods for pilot signal and control data retransmission.

BACKGROUND

In modern telecommunications, control information and data are typically carried in separate regions of the subframe or packet. For instance, in third generation partnership project (3GPP) long term evolution (LTE) networks, control information is carried in a physical downlink control channel (PDCCH) and/or enhanced PDDCH (ePDCCH) of the subframe, while data/traffic is carried in a physical shared control channel (PSCCH) of the subframe. Additionally, pilot signals are oftentimes communicated contemporaneously with the data transmission in order to facilitate demodulation. More specifically, a pilot signal consists of a series or collection of known reference symbols (i.e., a priori information) which the receiver evaluates upon reception in order to estimate parameters (e.g., fading, scattering) of the air channel. In 3GPP LTE networks, pilot signaling is achieved through the inclusion of cell-specific reference signals (CRS) and/or demodulation reference signals (DMRS) within the subframe.

Data recovery techniques/processes allow receivers to obtain data carried by an earlier data transmission with which the receiver was unable to successfully demodulate/decode. Conventional data recovery techniques rely on either re-transmitting the entire original data transmission or otherwise communicating additional forward error correction (FEC) bits related to the entire original data transmission, e.g., via hybrid automatic repeat request (HARQ) signaling. For instance, one conventional data recovery technique may re-transmit substantially all of the data/traffic carried in the PDSCH region of an LTE subframe. Another conventional data recovery technique may re-transmit FEC bits pertaining to the entire PDSCH region of the LTE subframe. These conventional techniques may consume significant bandwidth, particularly when the original data payload was large or when poor channel conditions necessitate a relatively low coding rate. As such, more efficient mechanisms for recovering data are desired.

SUMMARY OF THE INVENTION

Technical advantages are generally achieved, by embodiments of the present disclosure which describe systems and methods for pilot signal and control data retransmission.

In accordance with an embodiment, a method for operating a receiver is provided. In this example, the method includes receiving a first encoded packet carrying coded bits at a first time-frequency instance, estimating channel state information (CSI) corresponding to the first time-frequency instance, and storing the first encoded packet in memory. Thereafter, the method includes receiving a second encoded packet carrying a sub-set of the coded bits carried by the first encoded packet, comparing the sub-set of coded bits carried by the second encoded packet with a corresponding portion of the first encoded packet stored in memory to obtain improved CSI corresponding to the first time-frequency instance, and decoding the first encoded packet stored in memory in accordance with the improved CSI to obtain the coded bits. An apparatus for performing this method is also provided.

In accordance with another embodiment, another method for operating a receiver is provided. In this example, the method includes receiving a first encoded packet carrying coded bits at a first time-frequency instance, estimating channel state information (CSI) corresponding to the first time-frequency instance, and storing the first encoded packet in memory. Thereafter, the method includes receiving a second encoded packet carrying parity information related to a sub-set of the coded bits carried by the first encoded packet, performing data aided CSI estimation in accordance with the parity information to obtain improved CSI corresponding to the first time-frequency instance, and decoding the first encoded packet stored in memory in accordance with the improved CSI to obtain the coded bits. An apparatus for performing this method is also provided.

In accordance with yet another embodiment, another method for operating a receiver is provided. In this example, the method includes receiving a first signal carrying control information and data at a first time-frequency instance, storing the first signal in a memory, and receiving a second signal carrying the control information of the first signal at a second time-frequency instance. The method further includes obtaining the control information from the second signal, and decoding the first signal stored in memory in accordance with the control information obtained from the second signal to obtain the data. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
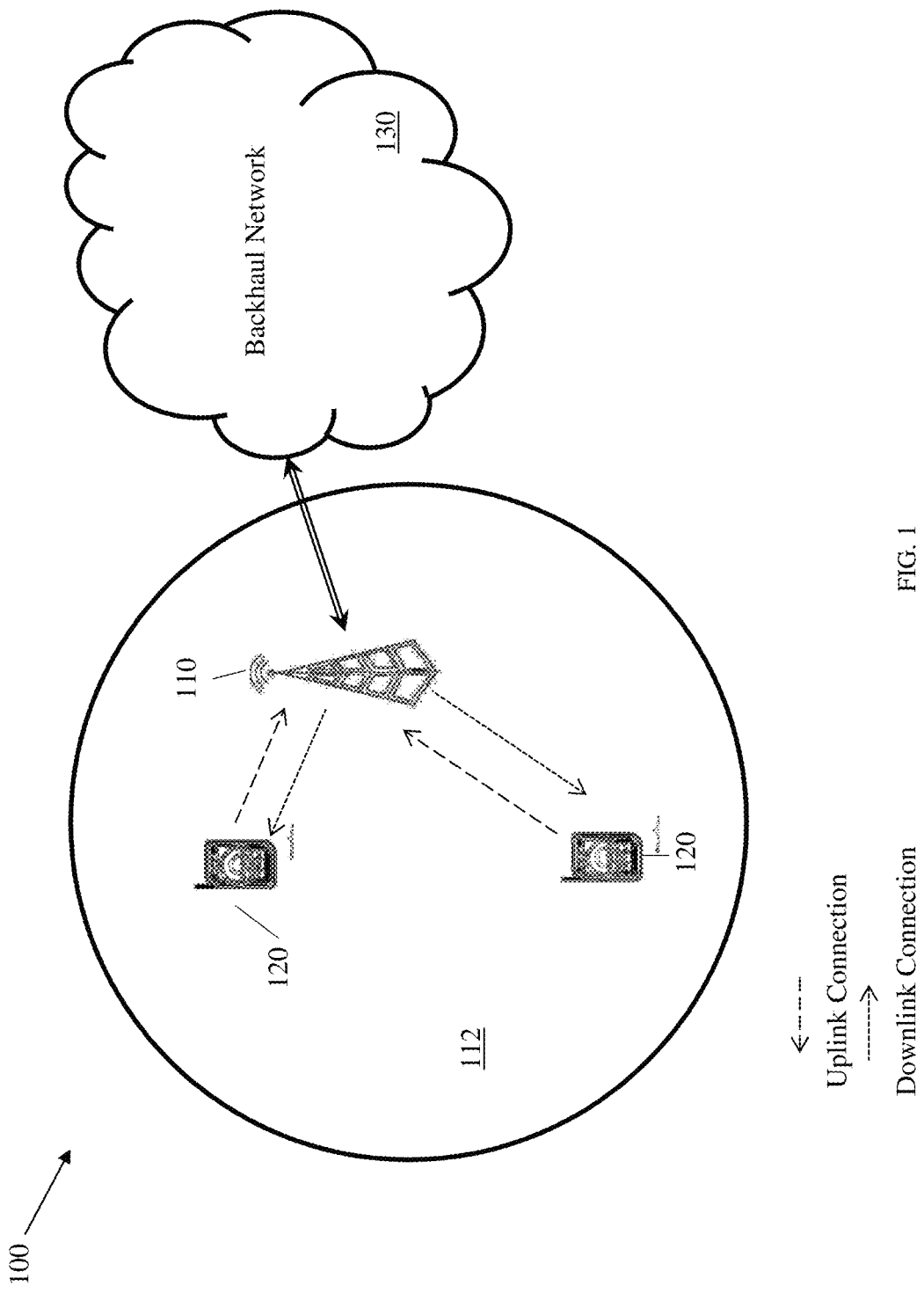
FIG. 1 illustrates a diagram of a wireless network for communicating data.

The making and using of the present embodiments are discussed in detail below. It should be appreciated, however, that the present disclosure provides various concepts that can be embodied in a wide variety of specific contexts. The specific embodiments discussed herein are merely illustrative of specific ways to make and use aspects of this disclosure, and do not limit the scope of the claims. Further, it should be understood that various changes, substitutions and alterations can be made herein without departing from the spirit and scope of this disclosure as defined by the appended claims.

Successful demodulation may typically require knowledge of the corresponding control information as well as relatively accurate channel state information (CSI). As a result, receivers that are unable to obtain control information from the control region may be prevented from decoding the data or payload portion of the data transmission. Additionally, receivers that have inadequate/poor CSI information may be prevented from decoding the data or payload portion of the data transmission. In such instances, it may be more efficient to recover the data by providing control information (or improved CSI) related to the original transmission, rather than re-communicating the entire payload (or FEC bits related thereto) as is typical in conventional data recovery schemes.

Aspects of this disclosure recover data by providing the receiver with the control information and/or more accurate CSI, thereby avoiding the re-transportation of the data/payload (or FEC bits related thereto) over the network. More specifically, a receiver that fails to decode an original signal may store the original signal in memory, and thereafter seek to obtain control information related to that original signal and/or improved CSI related to that original signal. Control information relevant to the original signal may be communicated in any number of ways (e.g., higher layer signaling, physical layer signaling, etc.), and may be provided by the original transmitter or by some other device (e.g., a relay, a third party mobile station, etc.). Improved CSI may be obtained by re-transmitting a sub-set of the coded bits (i.e., fewer than all of the coded bits) carried by the original signal or by communicating parity information related to a sub-set of the coded bits (i.e., fewer than all of the coded bits) carried by the original signal. When the sub-set of coded bits are included in the subsequent transmission, the receiver compares the sub-set of coded bits obtained from the subsequent transmission with a corresponding portion of the original signal (stored in memory) in order to obtain further insight into parameters/characteristics (e.g., fading, etc.) of the air channel during the original transmission period.

When parity information related to a sub-set of the coded bits is included in the subsequent transmission, the receiver uses the parity information in accordance with a data aided CSI estimation technique to obtain further insight into parameters/characteristics (e.g., fading, etc.) of the air channel during the original transmission period. More specifically, communication of the additional parity information creates an unequal error protection scenario, where the receiver has more parity information for the sub-set of coded bits than for the remaining coded bits. Accordingly, the receiver is able to determine values for the sub-set of coded bits with a high degree of probability, thereby effectively obtaining 'known values' for that sub-set of code bits. Thereafter, the receiver compares the known values with a corresponding portion of the original signal (stored in memory) to obtain the improved CSI, which is subsequently used to decode the original signal (stored in memory) and obtain the coded bits in their entirety.

FIG. 1 illustrates a network 100 for communicating data. The network 100 comprises an access point (AP) 110 having a coverage area 112, a plurality of user equipments (UEs) 120, and a backhaul network 130. The AP 110 may comprise any component capable of providing wireless access by, inter alia, establishing uplink (dashed line) and/or downlink (dotted line) connections with the UEs 120-125, such as a base station, an enhanced base station (eNB), a femtocell, and other wirelessly enabled devices. The UEs 120-125 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc.

Figure 2:
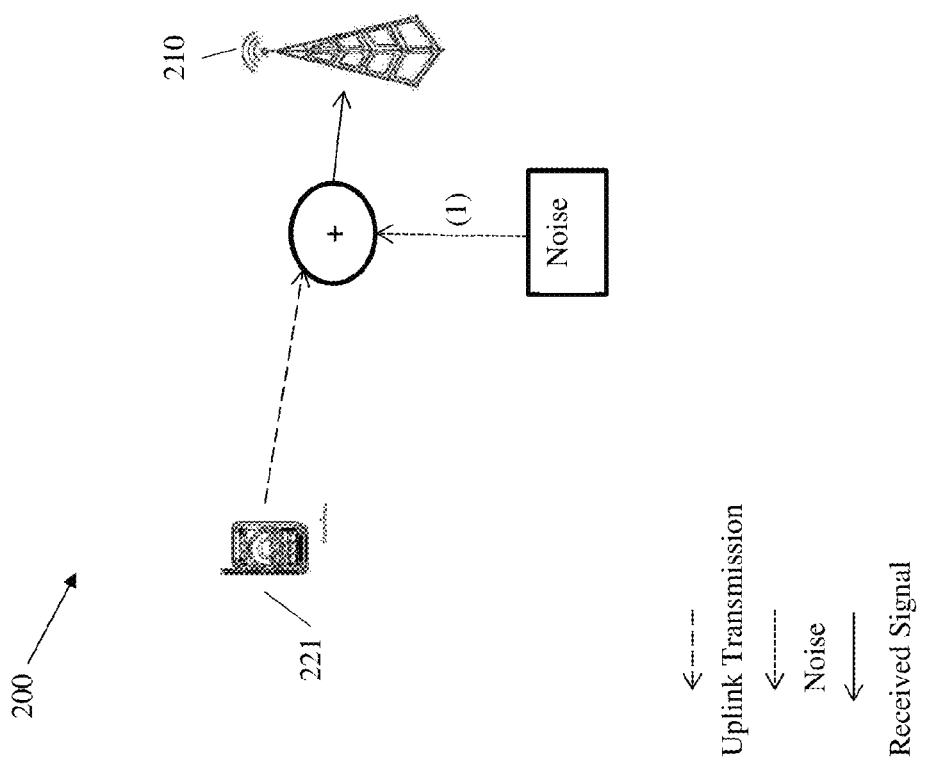
FIG. 2 illustrates a diagram of an embodiment network for communicating data in accordance with historical interference cancellation.

FIG. 2 illustrates a network 200 for communicating data from a UE 221 to an AP 210. The UE 221 sends an uplink transmission (dashed arrow), which is interfered with by a noise component (dotted arrow) of the air channel to produce the signal (solid arrow) received by the AP 210. In some embodiments, the uplink transmission may include a pilot signal, which the AP 210 may use to estimate the noise component as well as other parameters of the air channel. The AP 210 may be unable to decode all or portions of the received signal, and may resort to one of the data recovery techniques described herein to obtain data carried by the uplink transmission.

Figure 3:
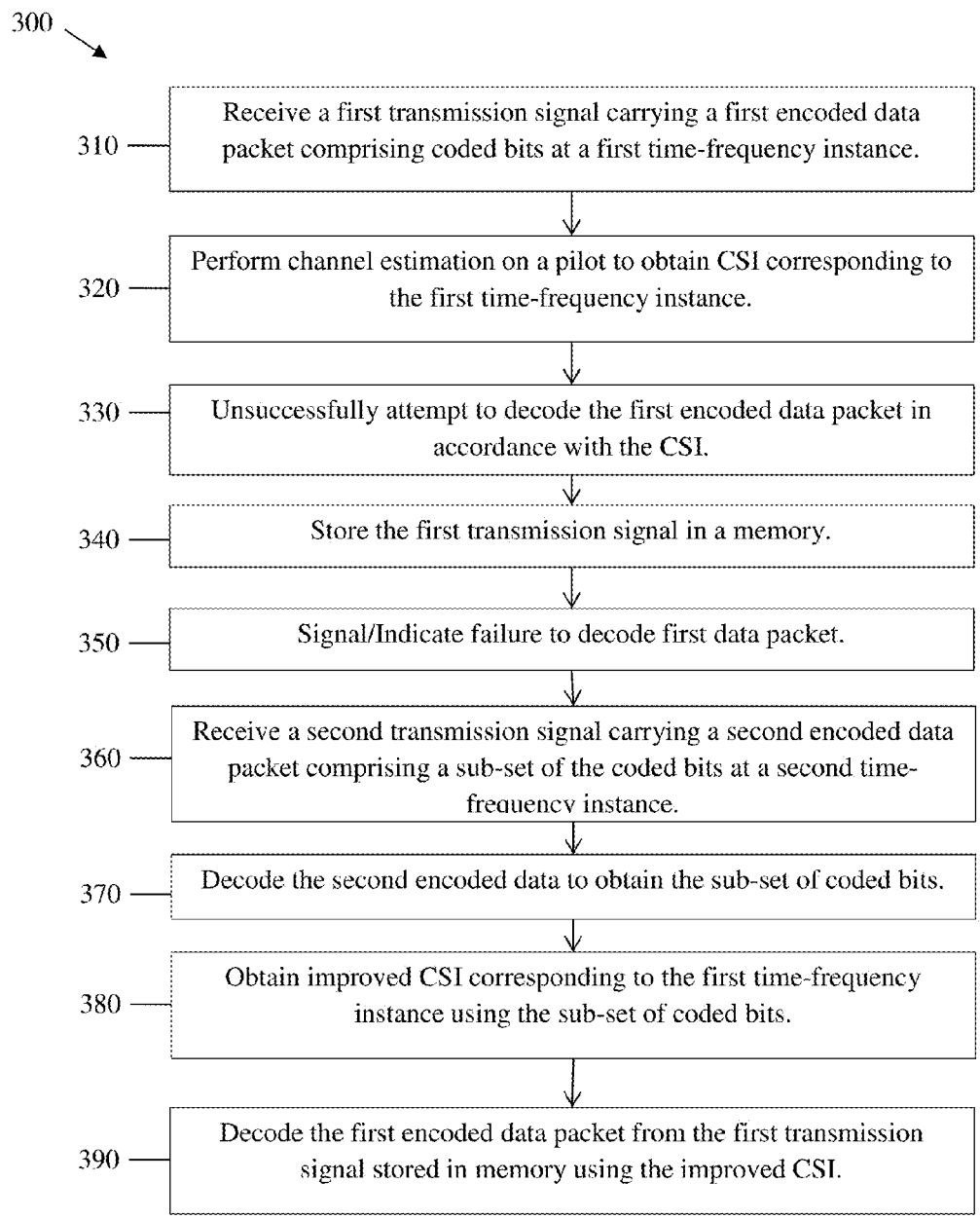
FIG. 3 illustrates a flowchart of a method for historical decoding in accordance with pilot retransmission.

FIG. 3 illustrates a method 300 for historical decoding in accordance with a pilot retransmission technique, as may be performed by a receiver. The method 300 begins at step 310, where the receiver receives a first signal carrying a first encoded packet comprising coded bits at a first time-frequency instance. Next, the method 300 proceeds to step 320, where the receiver performs channel estimation on a pilot to obtain channel state information (CSI) corresponding to the first time-frequency instance. In some embodiments, the steps 310 and 320 are performed concurrently or in reverse order. Thereafter, the method 300 proceeds to step 330, where the receiver unsuccessfully attempts to decode the first encoded packet in accordance with the CSI obtained from step 320. Subsequently, the method 300 proceeds to step 340, where the receiver stores the first signal in a memory.

Next, the method 300 proceeds to step 350, where the receiver signals or otherwise indicates a failure to decode the first encoded packet. This signaling or indication may be performed in any manner, such as through acknowledgement (ACK)/negative-acknowledgment (NACK) signaling. Thereafter, the method 300 proceeds to step 360, where the receiver receives a second signal carrying a second encoded packet comprising a sub-set of the coded bits at a second time-frequency instance. Notably, in one embodiment the second encoded packet carries a sub-set of the coded bits carried in the first encoded packet.

Subsequently, the method 300 proceeds to step 370, where the receiver decodes the second encoded packet to obtain the sub-set of coded bits. Next, the method 300 proceeds to step 380, where the receiver obtains improved CSI corresponding to the first time-frequency instance using the sub-set of coded bits. More specifically, the receiver compares the sub-set of decoded bits (which is known information at this point) with the portion of the first transmission stored in memory to determine channel parameters (e.g., channel gain, fading, etc.). From these channel parameters, the receiver estimates or approximates channel distortion occurring during the first time-frequency instance, and removes this estimated distortion from the first transmission stored in memory, thereby isolating the first encoded packet. Thereafter, the method 300 proceeds to step 390, where the receiver decodes the first encoded packet from the first signal stored in memory using the improved CSI, thereby obtaining the coded bits in their entirety.

In an alternative embodiment of the method 300, the second encoded packet (received during step 360) carries parity bits related to a sub-set of the coded bits carried in the first encoded packet. Unlike traditional HARQ, the parity bits carried by the second encoded packet are only related to a sub-set of the coded bits, which creates an unequal error protection scenario (e.g., where the receiver has more parity information for the sub-set of coded bits than for the remaining coded bits). The receiver then uses the parity bits to obtain improved CSI in accordance with a data aided CSI estimation scheme. Data aided CSI estimation is a process in which the data is used in channel estimation. As decoding proceeds, several data elements become 'known' with high probability, and these data elements are used in a CSI estimation scheme as pilots to improve the performance of the data decoding scheme. The process repeats until convergence or some other stopping criterion is reached. The improved CSI is then used to decode the first encoded packet (e.g., in its entirety), thereby obtaining the coded bits (in their entirety).

Figure 4:
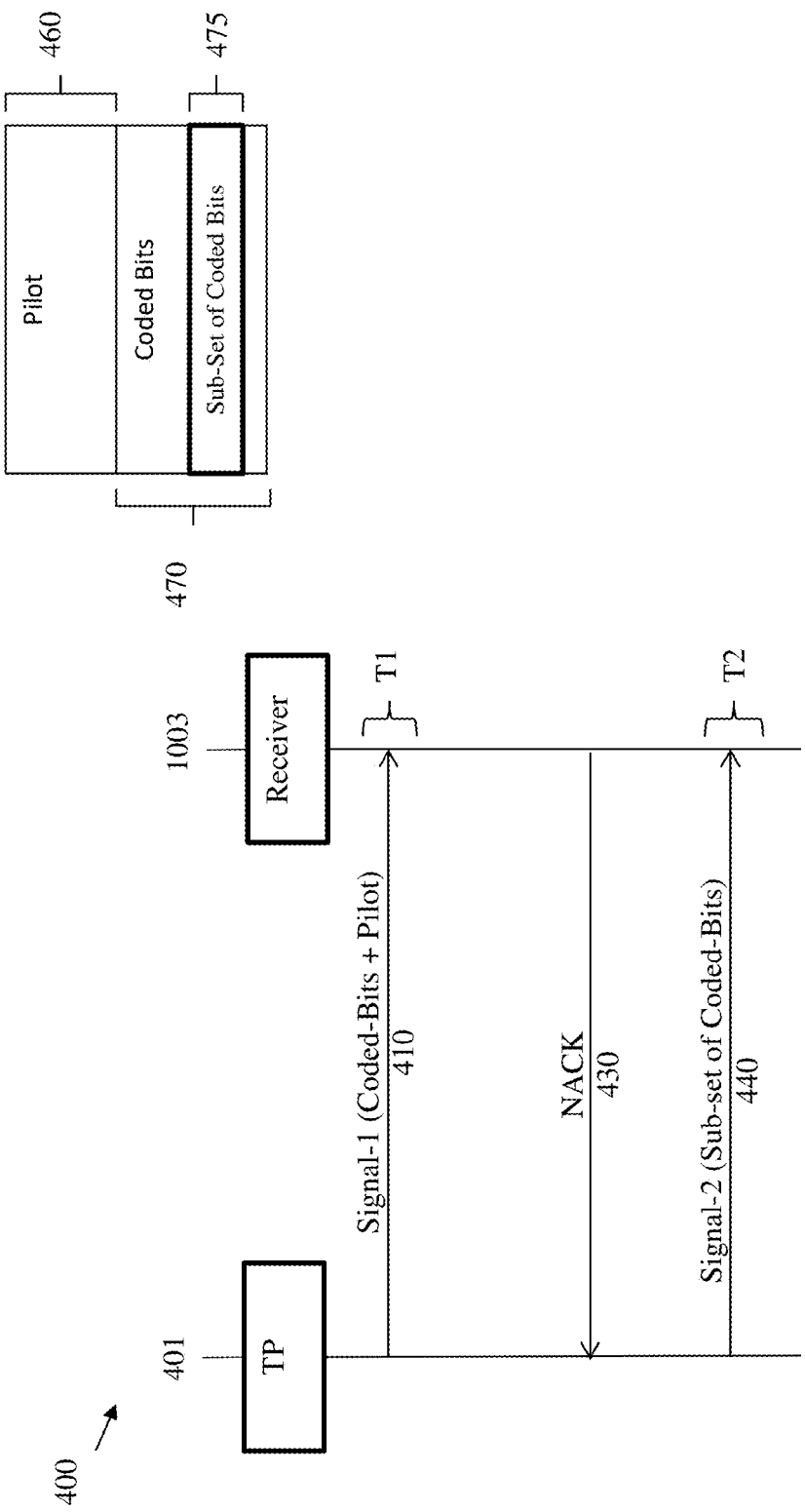
FIG. 4 illustrates a protocol diagram of an embodiment communications sequence for historical decoding in accordance with pilot retransmission.

FIG. 4 illustrates a protocol diagram of an embodiment communications sequence 400 for communicating data in accordance with a historical decoding technique that implements pilot retransmission, as may occur between a TP 401 and a receiver 403. The communications sequence 400 begins when the TP 401 transmits a first signal 410 comprising a pilot signal 460 and a first encoded packet to the receiver 403 at a first instance in time (T1). The first encoded packet includes comprising a plurality of coded bits 470. Upon reception, the receiver 403 performs channel estimation on the pilot signal 460 to generate CSI, and thereafter attempts to decode the first encoded packet in accordance with the CSI to obtain the plurality of coded bits 470. The receiver 403 is unable to decode the first encoded packet, and sends a NACK 430 to the TP 401 indicating such failure. Further, the receiver 403 stores the first signal 410 in a memory. Upon receiving the NACK 430, the TP 401 sends a second signal 440 to the receiver 403 at a second instance in time (T2). The second signal 440 carries a second encoded packet comprising a sub-set of coded bits 475. Notably the sub-set of coded bits 475 correspond to a portion of the coded bits 470 carried in the first encoded packet. The receiver 403 decodes the second encoded packet to obtain the sub-set of coded bits 475, and then uses the sub-set of coded bits 475 to achieve an improved CSI for the first instance in time (T1) during which the first signal 410 was received. The receiver 403 then uses the improved CSI to decode the first encoded packet from the first signal 410 stored in memory, thereby obtaining the coded bits 470 in their entirety.

Figure 5:
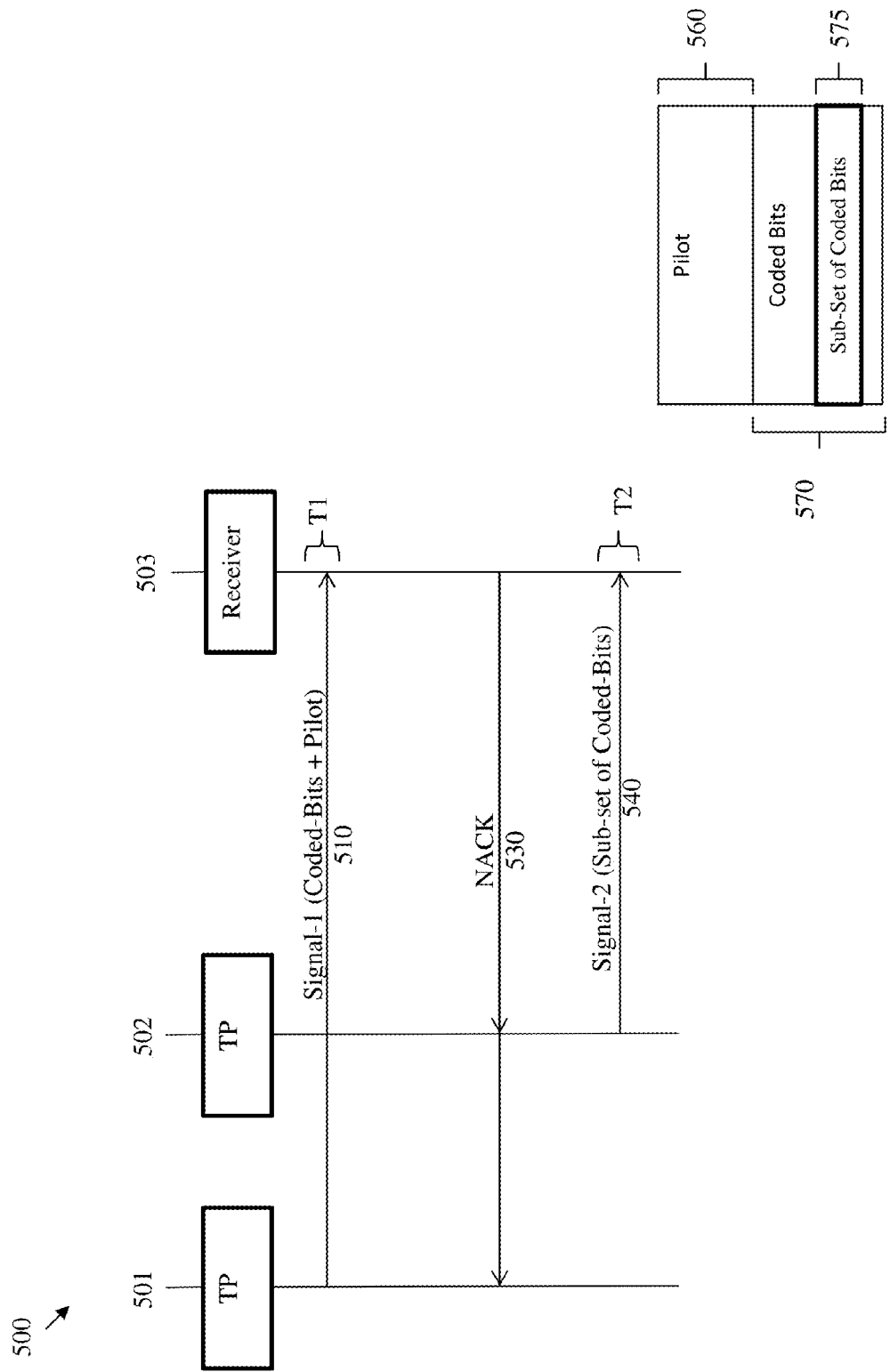
FIG. 5 illustrates a protocol diagram of another embodiment communications sequence for historical decoding in accordance with pilot retransmission.

FIG. 5 illustrates a protocol diagram of an embodiment communications sequence 500 for communicating data in accordance with a historical decoding technique that implements pilot retransmission, as may occur between a pair of TPs 501, 502 and a receiver 503. The communications sequence 500 may be similar to the communications sequence 500, with the exception that the sub-set of coded bits are sent from a third party TP 502, rather than the original TP 501.

Specifically, the communications sequence 500 begins when the TP 501 transmits a first signal 510 comprising a pilot 560 and an encoded packet to the receiver 503 during a first instance in time (T1). The first encoded packet comprises a plurality of coded-bits 570. Upon reception, the receiver 503 performs channel estimation on the pilot 560 to generate CSI, and thereafter attempts to decode the first encoded packet in accordance with the CSI to obtain the plurality of coded bits 570. The receiver 503 is unable to decode the first coded data packet, and sends a NACK 530 indicating such failure. The NACK 530 may be sent to the TP 501, to the TP 502, or broadcast to both the TPs 501, 502. In cases where the NACK is sent to the TP 501, the TP 502 may be configured to intercept the NACK 530. Further, the receiver 503 stores the first signal 510 in a memory. Upon receiving/intercepting the NACK 530, the TP 501 sends a second signal 540 to the receiver 503 at a second instance in time (T2). The second signal 540 carries a second encoded packet comprising a sub-set of the coded bits 575 carried in the first encoded packet. The receiver 503 decodes the second encoded packet to obtain the sub-set of coded bits 575, and then uses the sub-set of coded bits 575 to achieve an improved CSI for the first instance in time (T1) during which the first signal 510 was received. The receiver 503 then uses the improved CSI to decode the first encoded packet from the first signal 510 stored in memory, thereby obtaining the coded bits 570 in their entirety.

Another technique for historical decoding includes retransmission of control data. In some embodiments, historical decoding in accordance with retransmission of control data includes re-communicating encoded control information related to an earlier data transmission, and then using the excommunicated control information to decode the earlier data transmission which is stored in memory. Bandwidth savings is achieved because the encoded data does not have to be re-transported over the network.

Figure 6:
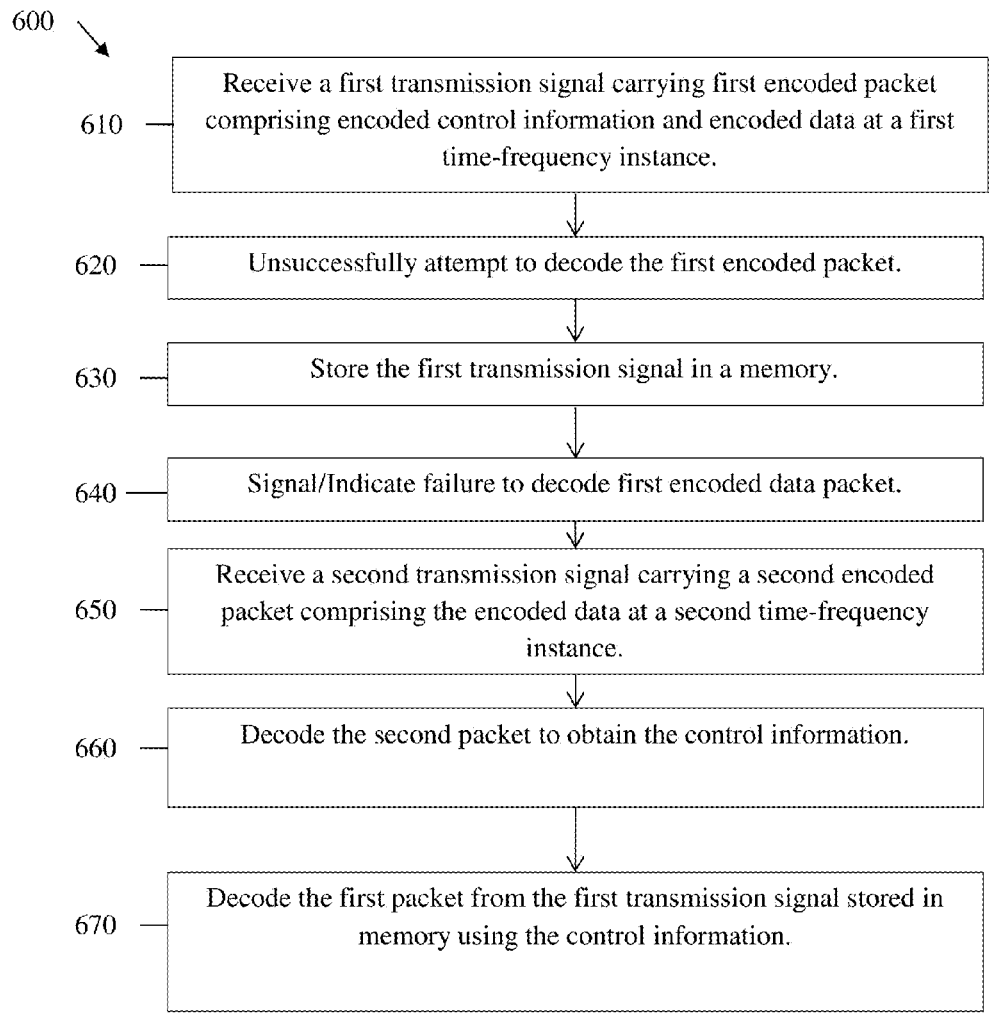
FIG. 6 illustrates a flowchart of a method for historical decoding in accordance with a retransmission of control data.

FIG. 6 illustrates a method 600 for performing historical decoding that includes a retransmission of control data, as may be performed by a receiver. The method 600 begins at step 610, where the receiver receives a first signal at a first time-frequency instance. The first signal carries a first encoded packet comprising encoded control information and encoded data. Next, the method 600 proceeds to step 620, where the receiver unsuccessfully attempts to decode the first encoded packet. In some embodiments, the receiver may attempt to decode the encoded control information before attempting to decode the encoded data, as the control information may be useful or necessary in decoding the coded data. Thereafter, the method 600 proceeds to step 630, where the receiver stores the first signal in memory.

Next, the method 600 proceeds to step 640, where the receiver signals or indicates a failure to decode the first data packet. In some embodiments, the signaling in step 640 is achieved by sending a negative-acknowledgment (NACK) message in a feedback channel at a time period associated with the first data packet. In other embodiments, the signaling in step 640 is achieved through a lack or absence of signaling, e.g., by not sending an acknowledgment (ACK) message in the feedback channel at a time period associated with the first data packet. This absence or lack of signaling may be interpreted by the transmitter and/or other devices monitoring the feedback channel as an indication that the receiver has failed to decode the encoded control information. Thereafter, the method 600 proceeds to step 650, where the receiver receives a second signal carrying a second encoded packet comprising the encoded control information. Notably, the second encoded packet comprises the encoded control information of the first encoded packet, but does not comprise the encoded data of the first encoded packet. Instead, the second encoded packet may comprise different data (e.g., unrelated to the previously communicated encoded data), or no data whatsoever.

Subsequently, the method 600 proceeds to step 660, where the receiver decodes the second encoded packet to obtain the control information. Next, the method 600 proceeds to step 670, where the receiver decodes the first packet from the first signal stored in memory using the control information, thereby obtaining the originally transmitted data (i.e., the data received in step 610).

Figure 7:
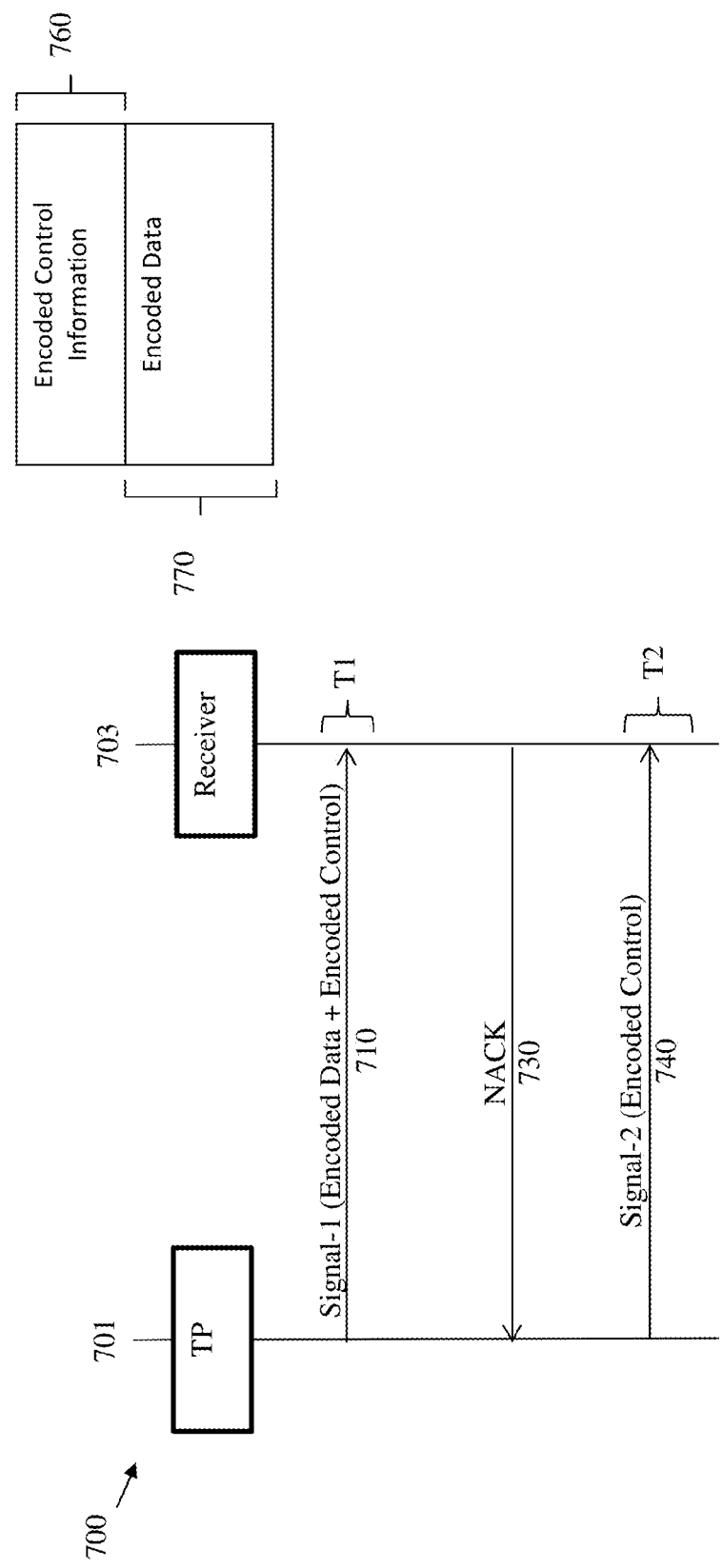
FIG. 7 illustrates a protocol diagram of an embodiment communications sequence for historical decoding in accordance with a retransmission of control data.

FIG. 7 illustrates a protocol diagram of an embodiment communications sequence 700 for communicating data in accordance with a historical decoding technique that includes the retransmission of control information, as may occur between a TP 701 and a receiver 703. The communications sequence 700 begins when the TP 701 sends a first signal 710 to the receiver 703 during a first instance in time (T1). The first signal 710 comprises encoded control information 760 and encoded data 770. In some embodiments, the encoded control information 760 and encoded data 770 may be transmitted together (e.g., in the same packet). In other embodiments, the encoded data and the encoded control information may be transmitted separately, in separate packets and/or over separate frequencies. For instance, the encoded data and the encoded control information may be transmitted in separate sub-bands. Upon reception, the receiver 703 is unable to decode the encoded control information, and sends a NACK 730 (or refrains from sending an ACK) to the TP 701 indicating such failure. Further, the receiver 703 stores the first signal 710 in a memory.

Upon receiving the NACK 730 (or failing to receive an ACK), the TP 701 sends a second signal 740 to the receiver 703 at a second instance in time (T2). The second signal 740 carries the encoded control information 760 of the first signal 710, but does not carry the encoded data 770 of the first signal 710. The receiver 703 decodes the encoded control information 760 communicated in the second signal 740, thereby obtaining control information. The receiver 703 then uses the control information to decode the encoded data 770 from the first signal 710 stored in memory, thereby obtaining the originally transmitted data (i.e., the data carried in the first signal 710).

Figure 8:
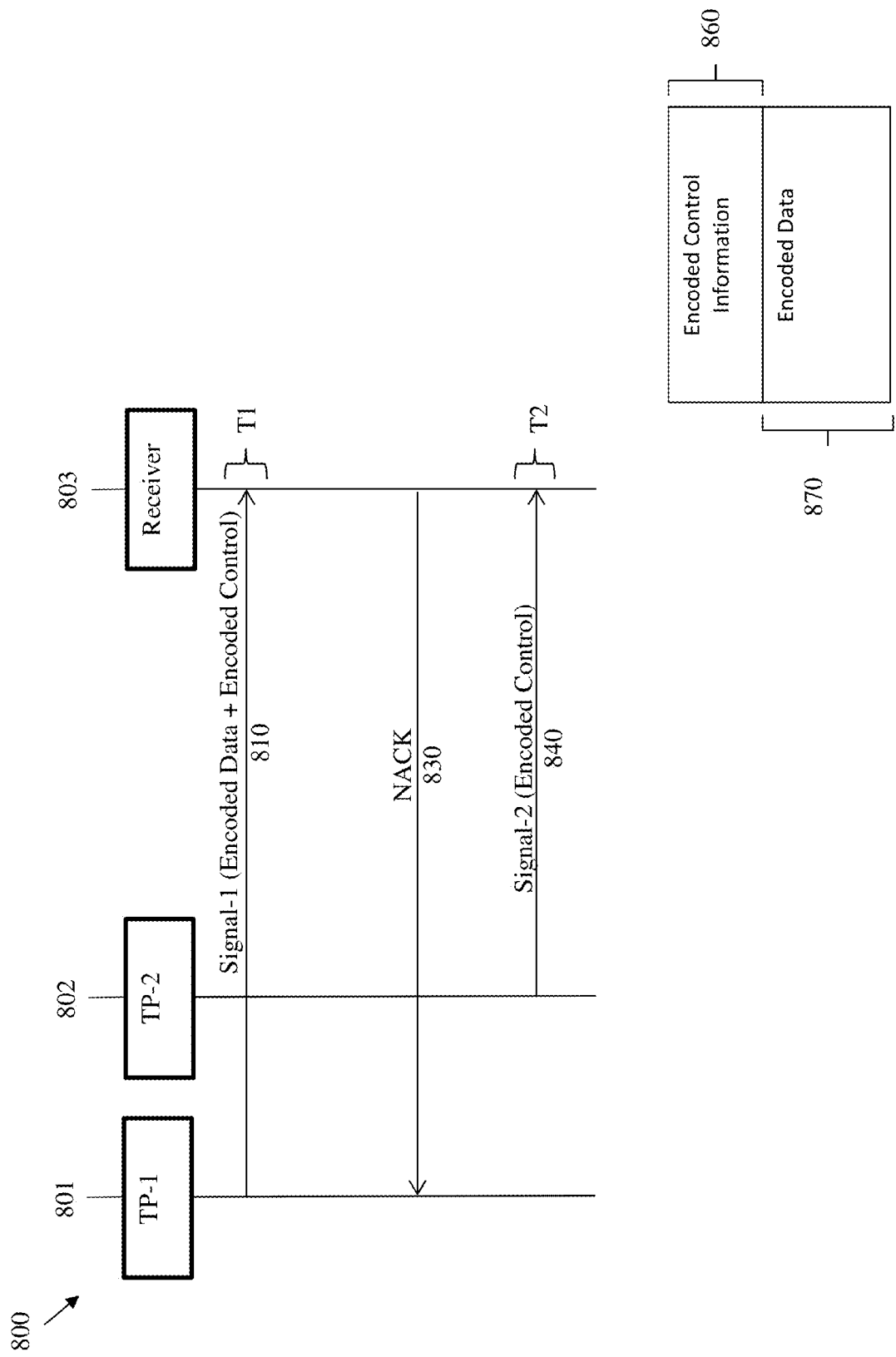
FIG. 8 illustrates a protocol diagram of another embodiment communications sequence for historical decoding in accordance with a retransmission of control data.

FIG. 8 illustrates a protocol diagram of an embodiment communications sequence 800 for communicating data in accordance with a historical decoding technique that includes the retransmission of control information, as may occur between TPs 801, 802 and a receiver 803. The communications sequence 800 may be similar to the communications sequence 700, with the exception that the encoded control information 760 is retransmitted from a third party TP 802, rather than the original TP 801.

Specifically, the communications sequence 800 begins when the TP 801 sends a first signal 810 to the receiver 803 during a first instance in time (T1). The first signal 810 comprises encoded control information 860 and encoded data 870. Upon reception, the receiver 803 is unable to decode the encoded control information 860, and sends a NACK 830 (or refrains from sending an ACK) to the TP 801 indicating such failure. The receiver 803 also stores the first signal 810 in a memory.

Upon receiving the NACK 830 (or failing to receive an ACK), the TP 801 sends a second signal 840 to the receiver 803 at a second instance in time (T2). The second signal 840 carries the encoded control information 860 of the first signal 810, but does not carry the encoded data 870 of the first signal 810. The receiver 803 decodes the encoded control information 860 communicated in the second signal 840, thereby obtaining control data. The receiver 803 then uses the control data to decode the encoded data 870 from the first signal 810 stored in memory, thereby obtaining the originally transmitted data (i.e., the data carried in the first signal 810).

Aspects of this disclosure described above in FIGS. 3-8 may be applied in a variety of configurations. For example, the data communication may occur in an uplink channel of a cellular network, where the receiver is a base station, eNB, or some other network component configured for uplink reception and where at least one of the transmitters is a UE, mobile device, or some other device configured for uplink transmission. As another example, the data communication may occur in a downlink channel of a cellular network, where the receiver is a UE, mobile device, or some other device configured for downlink reception, and where at least one of the transmitters is a base station, eNB, or some other network component configured for downlink reception. As another example, the data communication may occur over a device-to-device (D2D) link, where the receiver and at least one of the transmitters are peer mobile devices. Other configurations are also possible.

Figure 9:
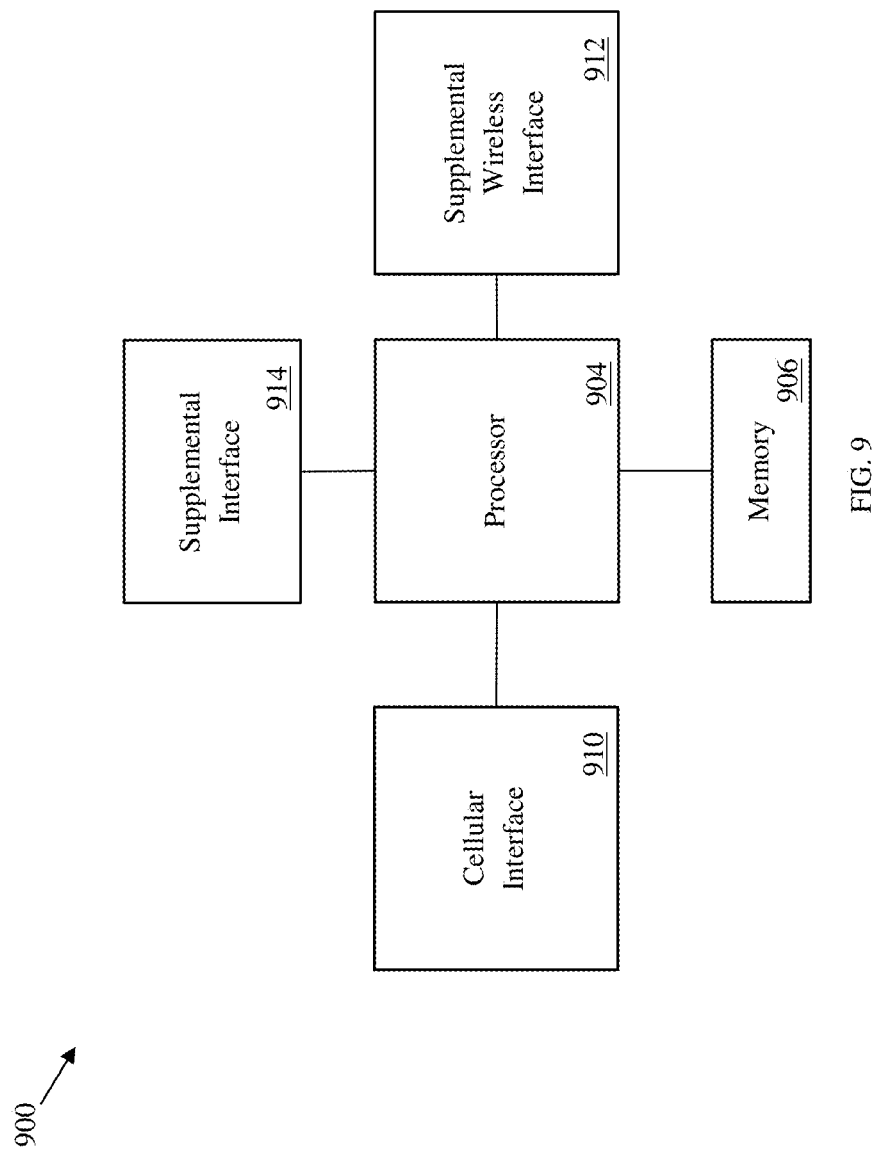
FIG. 9 illustrates a block diagram of an embodiment communications device.

FIG. 9 illustrates a block diagram of an embodiment of a communications device 900, which may be equivalent to one or more devices (e.g., UEs, NBs, etc.) discussed above. The communications device 900 may include a processor 904, a memory 906, a cellular interface 910, a supplemental wireless interface 912, and a supplemental interface 914, which may (or may not) be arranged as shown in FIG. 9. The processor 904 may be any component capable of performing computations and/or other processing related tasks, and the memory 906 may be any component capable of storing programming and/or instructions for the processor 904. The cellular interface 910 may be any component or collection of components that allows the communications device 900 to communicate using a cellular signal, and may be used to receive and/or transmit information over a cellular connection of a cellular network. The supplemental wireless interface 912 may be any component or collection of components that allows the communications device 900 to communicate via a non-cellular wireless protocol, such as a Wi-Fi or Bluetooth protocol, or a control protocol. The device 900 may use the cellular interface 910 and/or the supplemental wireless interface 912 to communicate with any wirelessly enabled component, e.g., a base station, relay, mobile device, etc. The supplemental interface 914 may be any component or collection of components that allows the communications device 900 to communicate via a supplemental protocol, including wire-line protocols. In embodiments, the supplemental interface 914 may allow the device 900 to communicate with another component, such as a backhaul network component.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed:

1. A method for operating a receiver, the method comprising:
   receiving, by the receiver, a first encoded packet carrying coded bits at a first time-frequency instance;
   estimating channel state information (CSI) corresponding to the first time-frequency instance;
   storing the first encoded packet in memory;
   receiving, by the receiver, a second encoded packet at a second time-frequency instance, the second encoded packet carrying a sub-set of the coded bits carried by the first encoded packet;

comparing the sub-set of coded bits carried by the second encoded packet with a corresponding portion of the first encoded packet stored in the memory to obtain improved CSI corresponding to the first time-frequency instance, wherein comparing the sub-set of coded bits carried by the second packet with the corresponding portion of the first encoded packet comprises determining values for the sub-set of coded bits carried by the second encoded packet, and comparing the values of the sub-set of coded bits carried by the second encoded packet to the corresponding portion of the first encoded packet stored in the memory to obtain the improved CSI corresponding to the first time-frequency instance; and decoding the first encoded packet stored in the memory in accordance with the improved CSI to obtain the coded bits.

2. The method of claim 1, wherein the sub-set of coded bits carried by the second encoded packet includes fewer than all of the coded bits carried by the first encoded packet.

3. The method of claim 1, wherein decoding the first encoded packet comprises obtaining the coded bits in their entirety.

4. The method of claim 1, wherein the improved CSI specifies channel properties of a communications link carrying the first encoded packet.

5. A receiver comprising:
a processor; and
a non-transitory computer readable storage medium storing programming for execution by the processor, the programming including instructions to:
receive a first encoded packet carrying coded bits at a first time-frequency instance;
estimate channel state information (CSI) corresponding to the first time-frequency instance;
store the first encoded packet in memory;
receive a second encoded packet at a second time-frequency instance, the second encoded packet carrying a sub-set of the coded bits carried by the first encoded packet;
compare the sub-set of coded bits carried by the second encoded packet with a corresponding portion of the first encoded packet stored in the memory to obtain improved CSI corresponding to the first time-frequency instance, wherein the instructions to compare the sub-set of coded bits carried by the second packet with the corresponding portion of the first encoded packet includes instructions to determine values for the sub-set of coded bits carried by the second encoded packet, and to compare the values of the sub-set of coded bits carried by the second encoded packet to the corresponding portion of the first encoded packet stored in the memory to obtain the improved CSI corresponding to the first time-frequency instance; and
decode the first encoded packet stored in the memory in accordance with the improved CSI to obtain the coded bits.

6. The receiver of claim 5, wherein the sub-set of coded bits carried by the second encoded packet includes fewer than all of the coded bits carried by the first encoded packet.

7. The receiver of claim 5, wherein the instructions to decode the first encoded packet include instructions to obtain the coded bits in their entirety.

8. The receiver of claim 5, wherein the improved CSI specifies channel properties of a communications link carrying the first encoded packet.

9. A method for operating a receiver, the method comprising:
receiving, by the receiver, a first encoded packet carrying coded bits at a first time-frequency instance;
estimating channel state information (CSI) corresponding to the first time-frequency instance;
storing the first encoded packet in memory;
receiving, by the receiver, a second encoded packet at a second time-frequency instance, the second encoded packet carrying parity information related to a sub-set of the coded bits carried by the first encoded packet;
performing data aided CSI estimation in accordance with the parity information to obtain improved CSI corresponding to the first time-frequency instance, wherein performing data aided CSI estimation in accordance with the parity information to obtain the improved CSI comprises determining values for the sub-set of coded bits in accordance with the parity information carried by the second encoded packet, and comparing the values with a corresponding portion of the first encoded packet stored in the memory to obtain the improved CSI; and
decoding the first encoded packet stored in the memory in accordance with the improved CSI to obtain the coded bits.

10. The method of claim 9, wherein the parity information carried by the second encoded packet is related to fewer than all of the coded bits carried by the first encoded packet.

11. A receiver comprising:
a processor; and
a non-transitory computer readable storage medium storing programming for execution by the processor, the programming including instructions to:
receive a first encoded packet carrying coded bits at a first time-frequency instance
estimate channel state information (CSI) corresponding to the first time-frequency instance;
store the first encoded packet in memory;
receive a second encoded packet at a second time-frequency instance, the second encoded packet carrying parity information related to a sub-set of the coded bits carried by the first encoded packet;
perform data aided CSI estimation in accordance with the parity information to obtain improved CSI corresponding to the first time-frequency instance, wherein the instructions to perform data aided CSI estimation in accordance with the parity information to obtain improved CSI includes instructions to determine values for the sub-set of coded bits in accordance with the parity information carried by the second encoded packet, and to compare the values with a corresponding portion of the first encoded packet stored in the memory to obtain the improved CSI; and
decode the first encoded packet stored in the memory in accordance with the improved CSI to obtain the coded bits.

12. The receiver of claim 11, wherein the parity information carried by the second encoded packet is related to fewer than all of the coded bits carried by the first encoded packet.

* * * * *